United States Patent [19]
Fung

[11] Patent Number: 5,589,810
[45] Date of Patent: Dec. 31, 1996

[54] SEMICONDUCTOR PRESSURE SENSOR AND RELATED METHODOLOGY WITH POLYSILICON DIAPHRAGM AND SINGLE-CRYSTAL GAGE ELEMENTS

[75] Inventor: Clifford D. Fung, Mansfield, Mass.

[73] Assignee: The Foxboro Company, Foxboro, Mass.

[21] Appl. No.: 210,422

[22] Filed: Mar. 18, 1994

Related U.S. Application Data

[60] Continuation-in-part of Ser. No. 38,664, Mar. 26, 1993, Pat. No. 5,357,808, which is a division of Ser. No. 676,914, Mar. 28, 1991, Pat. No. 5,220,838.

[51] Int. Cl.$^6$ .................................................. G01L 1/22
[52] U.S. Cl. ........................ 338/4; 73/862.474; 338/42
[58] Field of Search .............................. 338/2, 4, 5, 36, 338/42; 73/718, 721, 727, 862.451, 862.46, 862.473, 862.474; 156/628.1; 437/901, 919

[56] References Cited

U.S. PATENT DOCUMENTS

| | | |
|---|---|---|
| 3,930,823 | 1/1976 | Kurtz et al. . |
| 3,938,175 | 2/1976 | Jaffe et al. . |
| 4,320,664 | 3/1982 | Rehn et al. ................................ 73/708 |
| 4,456,901 | 6/1984 | Kurtz et al. . |
| 4,510,671 | 4/1985 | Kurtz et al. ................................ 338/5 |
| 4,672,354 | 6/1987 | Kurtz et al. . |
| 4,721,938 | 1/1988 | Stevenson ................................ 338/4 |
| 4,975,390 | 12/1990 | Fujii et al. ............................. 437/901 |
| 4,994,781 | 2/1991 | Sahagen . |
| 5,074,152 | 12/1991 | Ellner et al. . |
| 5,088,329 | 2/1992 | Sahagen . |
| 5,095,401 | 3/1992 | Zavracky et al. ..................... 361/283.4 |
| 5,165,289 | 11/1992 | Tilmans ................................. 73/862.59 |
| 5,220,838 | 6/1993 | Fung et al. ................................ 73/721 |
| 5,316,619 | 5/1994 | Mastrangelo ........................... 437/919 |
| 5,357,807 | 10/1994 | Guckel et al. ............................... 338/4 |

FOREIGN PATENT DOCUMENTS

| | | |
|---|---|---|
| 2429894 | 1/1975 | Germany . |
| 3319605 | 12/1984 | Germany . |

OTHER PUBLICATIONS

European Search Report dated May 6, 1996 in European Patent Application No. 95103970.0.

*Primary Examiner*—Teresa J. Walberg
*Assistant Examiner*—Raphael Valencia
*Attorney, Agent, or Firm*—Lahive & Cockfield

[57] ABSTRACT

A semiconductor pressure sensor utilizes single-crystal silicon piezoresistive gage elements dielectrically isolated by silicon oxide from other such elements, and utilizes an etched silicon substrate. P-type implants form p-type piezoresistive gage elements and form p+ interconnections to connect the sensor to external electrical devices. The diaphragm is made from polysilicon and is deposited on top of the gage elements.

9 Claims, 3 Drawing Sheets

SEMICONDUCTOR PRESSURE SENSOR AND RELATED METHODOLOGY WITH POLYSILICON DIAPHRAGM AND SINGLE-CRYSTAL GAGE ELEMENTS

REFERENCE TO RELATED APPLICATION

This is a continuation-in-part of U.S. patent application Ser. No. 08/038,664, filed on 26 Mar. 1993, that issued as U.S. Pat. No. 5,357,808; which is a divisional application of U.S. patent application No. 07/676,914, filed on 28 Mar. 1991, that issued as U.S. Pat. No. 5,220,838; each of which is expressly incorporated herein by reference.

This application is related to the following commonly-assigned application filed the same day herewith: United States Application Ser. No. 08/462,176 for SEMICONDUCT PRESSURE SENSOR AND RELATED METHODOLOGY WITH SINGLE-CRYSTAL SILICON DIAPHRAGM AND SINGLE-CRYSTAL GAGE ELEMENTS (Attorney Docket No. FOM-019B). The disclosure of the above-cited application is incorporated herein by reference.

BACKGROUND

This invention relates to semiconductor pressure sensors, and to improved methods for manufacturing such devices.

Semiconductor pressure sensors and strain gages are commonplace today. Their extremely small size, less than 0.125 inch in any dimension, is typical. High durability to outside forces makes these devices popular for the pressure measurement needs of hydraulic and aerodynamics forces, among other applications.

Typically, semiconductor pressure sensors contain a diaphragm of one or more silicon layers for deflecting in response to opposing pressure environments, and piezoresistive elements that are configured for sensing the direction and/or magnitude of diaphragm deflection.

The manufacture of these sensors makes the diverse range of devices available today and one aspect of the invention provides improvements in that manufacture. Because high temperature stability is often required, improvements relating to sensor heat stability is an active research area. Dielectric isolation is one technique which increases stability. The dielectric ideally isolates semiconductor piezoresistive elements from the diaphragm, the support structure, and other piezoresistive elements. Silicon dioxide, $SiO_2$, exemplifies a known dielectric that maintains a nearly constant resistance over significant temperature changes.

The type of silicon used in the pressure sensor is also important. Single-crystal silicon and polycrystalline silicon materials have different properties that influence mechanical strength, sensitivity, and even manufacturability.

Despite the advances made in semiconductor physics, pressure sensors with improved temperature stability and higher pressure sensitivity are sought, particularly for use in hostile environments Devices available today generally have limited sensitivity and dielectric isolation, that restrict stability and high temperature operation.

In U.S. Pat. No. 4,672,354 for "Fabrication of Dielectrically Isolated Fine Line Semiconductor Transducers and Apparatus", for example, glass is used as an insulator and as a bonding agent. Such a pressure transducer is difficult to manufacture, and has other undesirable characteristics.

With this background, an object of this invention is to provide improved semiconductor pressure sensors and associated methods, and in particular, for uses which require high temperature stability and high sensitivity.

Another object of the invention is to provide a high sensitivity semiconductor pressure sensor which is easier to manufacture than competitive existing sensors.

A further object of this invention is to provide a semiconductor pressure sensor, and a related method of manufacture for dielectrically isolating single crystal silicon sensors.

Other objects of the invention are evident in the description which follows.

SUMMARY OF THE INVENTION

The invention features, in one aspect, a semiconductor pressure sensor having a polysilicon diaphragm and a supporting etched silicon substrate. A piezoresistive single-crystal gage element of p-type implants is disposed adjacent a first side of the diaphragm and is dielectrically isolated from other elements of the sensor by a layer of silicon oxide formed by oxygen ion implantation. An electrical interconnection connects the gage element to external electronics.

Preferably, the silicon substrate and the oxygen ion implantation form a common silicon-on-insulator (SOI) wafer, and additional surface-annealed silicon forms the piezoresistive gage element. The gage element is further isolated by the silicon oxide layer within the SOI wafer.

In other aspects, the piezoresistive gage element is disposed between the diaphragm and the substrate. This facilitates the manufacturing process and allows the substrate to be etched on a backside, away from the rest of the pressure sensor. A further dielectric isolator, of passivating nitride, can provide additional electrical isolation for the p-type piezoresistive gage element.

The invention also features methods for manufacturing semiconductor pressure sensors. According to one aspect, the method includes the steps of forming a single-crystal piezoresistive gage element by boron ion implantation and etching the surface of annealed silicon of a silicon-on-insulator (SOI) wafer. The wafer includes a silicon substrate, a first oxygen ion implantation to form silicon oxide, and the aforementioned surface annealed silicon. Polysilicon is deposited on the gage element to form a diaphragm with opposing first and second surfaces, with the piezoresistive gage element adjacent the first surface. Evaporated metal, e.g., aluminum, is deposited and etched to provide an external electrical connection to the piezoresistive gage element. The silicon substrate, as part of the SOI wafer, is then etched to provide a backside pressure port such that the diaphragm can deflect in response to a pressure difference between the first and second surfaces. A nitride deposition layer is preferably deposited on the piezoresistive gage element to provide additional dielectric isolation.

These and other features of a sensor according to the invention provide several advantages. In particular, the dielectric isolation of the silicon oxide layer provides the sensor with high operating stability and high temperature capability, and also provides an etch stop for backside etching of the pressure port. By using single-crystal silicon as the piezoresistive gage element, the sensor provides relatively high sensitivity at low pressure differentials and is relatively easy to manufacture. This enables the device to be coupled more effectively with digital electronics, with the potential for meeting high-performance, intelligent pressure transmitter needs. The polysilicon diaphragm provides improved robustness and improved control of diaphragm thickness as compared to sensors employing single-crystal diaphragms. Further, the configuration of the sensor provides protection of the gage elements because they are sandwiched between the polysilicon diaphragm and the silicon oxide isolation layer and the silicon substrate.

These and other aspects and advantages will become apparent in the following description.

BRIEF DESCRIPTION OF THE DRAWINGS

For a fuller understanding of the nature and objects of the invention, reference should be made to the following detailed description and the accompanying drawings, in which.

DESCRIPTION OF ILLUSTRATED EMBODIMENTS

Figure 1:
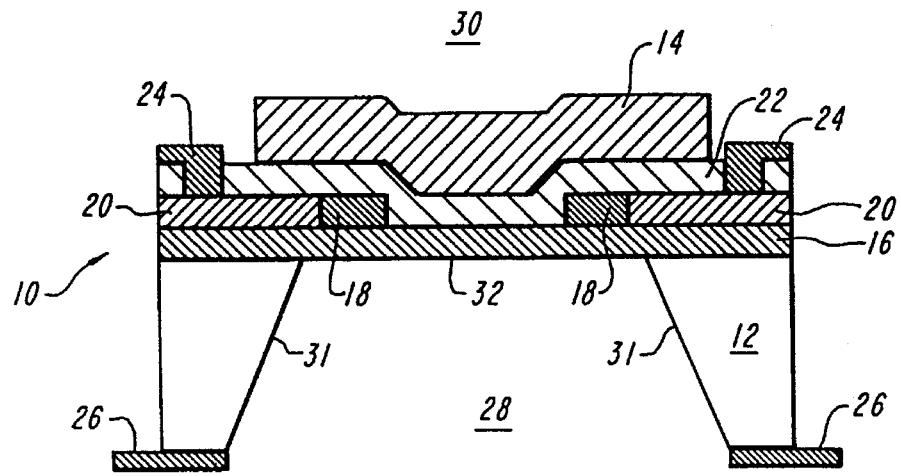
FIG. 1 is a cross-sectional view of a semiconductor pressure sensor constructed in accordance with the invention.
Figure 1A:
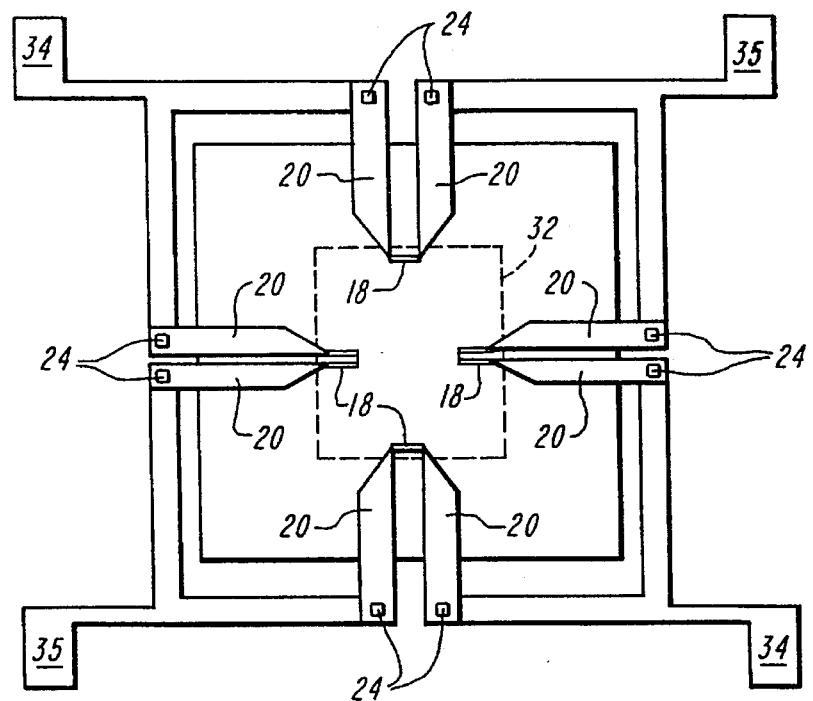
FIG. 1A illustrates a schematic top view of the pressure sensor of FIG. 1.

FIGS. 1 and 1A show a semiconductor pressure sensor 10 with an etched silicon substrate 12 supporting a polysilicon diaphragm 14 at the top, in a configuration that facilitates the manufacturing process. The substrate 12 includes a localized region of oxygen ion implantation to form a silicon oxide layer 16. The sensor 10 is annealed and implanted with boron ions, in selected localized regions, and selectively etched, to form p-type gage piezoresistors 18 and p++ interconnections 20. A nitride deposition layer 22 preferably passivates the p-type piezoresistors 18. Metal contacts 24 provide electrical communication to the p+ interconnections 20 and provide a way to externally connect the sensor 10 to a further electrical device.

The electrical signals produced at the metal contacts 24 are an indication of the pressure differential across the diaphragm 14, i.e., between pressure environments 28 and 30. The electrical signals produced by the p-type gage elements 18 are indicative of a resistance change functionally dependent upon the local stress distribution of the diaphragm 14. The etched portion 31 of the substrate 12 defines a pyramidal pressure port 32, which exposes the diaphragm 14 to the pressure environment 28, and the substrate 12 supports the sensor 10 at mounting points 26.

Figure 2:
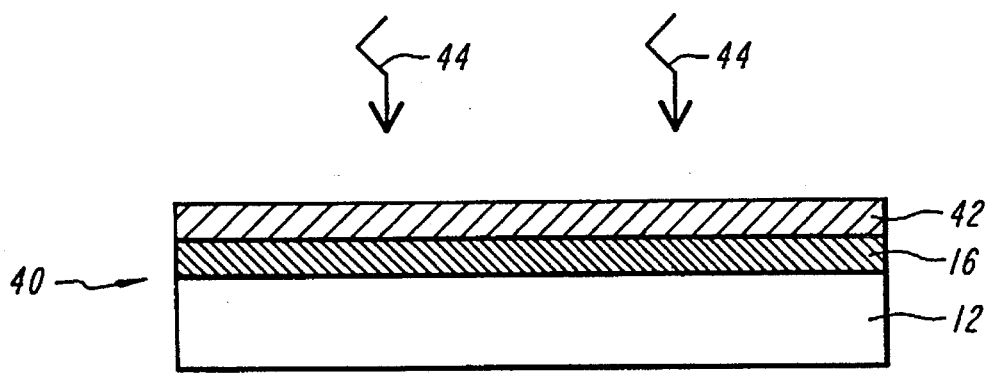
FIG. 2 is a cross-sectional view of an illustrative silicon-on-insulator (SOI) wafer.
Figure 2A:
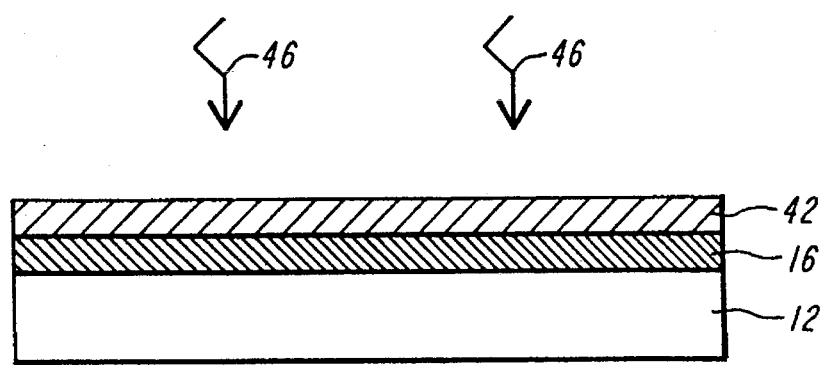
FIG. 2A shows the SOI wafer of FIG. 2 implanted selectively with boron ions to create p-type regions as sensing resisters and p+ regions for interconnection
Figure 2B:
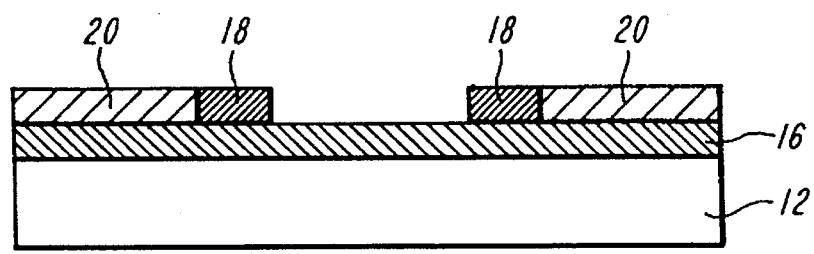
FIG. 2B shows the wafer of FIG. 2A after etching to form P+interconnection and P-type sensing resistors.
Figure 2C:
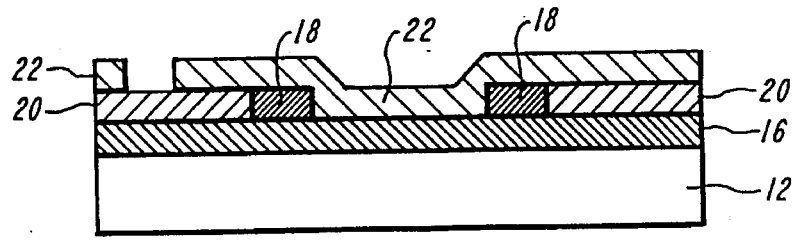
FIG. 2C shows the wafer of FIG. 2B with an additional nitride deposition and etching.
Figure 2D:
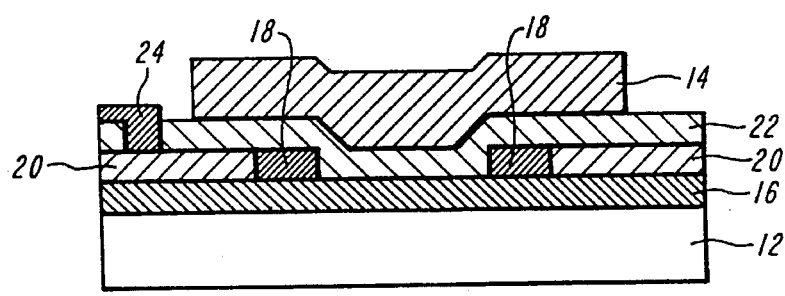
FIG. 2D shows the wafer of FIG. 2C with a polysilicon deposition and etching to form a polysilicon diaphragm.
Figure 2E:
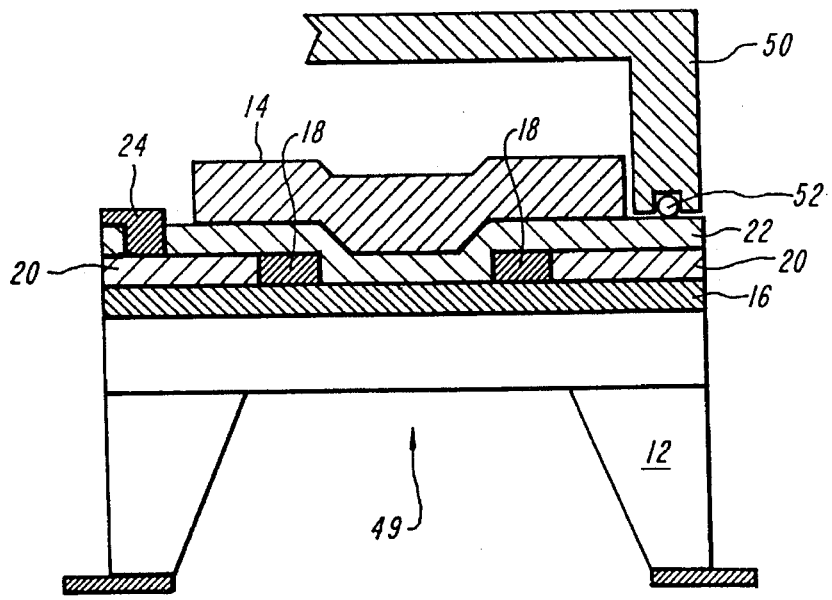
FIG. 2E schematically illustrates in a cross-sectional side view the pressure sensor of FIG. 1 in an etching fixture for etching the silicon substrate.

The FIG. 1 showing of the pressure sensor 10, and the similar drawings in FIGS. 2–2E, contain exaggerated proportions for clarity of illustration. For example, the silicon oxide layer 16, FIG. 1, is typically 0.45 micron thick, and the etched piezoresistive gage elements 18 are typically 0.4 micron thick.

FIG. 1A is a diagrammatic top view (not to scale) of the sensor 10 of FIG. 1, and, for clarity of illustration, shows the p+ interconnections 20 and the p-type piezoresistive elements 18 above the diaphragm when in fact they are beneath it. The gage elements 18, which preferably inter-connect and form a conventional Wheatstone bridge configuration at the inner ends of the p+ interconnections 20, are located over the edges of the pressure port 32, as defined by the edge of the substrate silicon etched portion 31 (FIG. 1). The metal contacts 24, for connecting the sensor 10 to external electronics, are located at the outer ends of the p+ interconnections 20. A disturbance to this bridge circuit, caused by pressure-induced diaphragm deflection, provides a measurable voltage signal at the contacts 24.

In order to produce maximal additive read-out of diaphragm movement, the gage elements 18 are preferably oriented in a push-pull configuration. In this configuration, each of the elements 18 is oriented relative to the edge of the diaphragm 14 that is nearest to the element, with two of the elements 18 arranged perpendicular to the edge, and the other two elements arranged parallel to the edge.

The sensor 10 can include aluminum bond pads 34 and 35, as also illustrated in FIG. 1A. Typically, the pads 34 are connected to a voltage source, and the pads 35 provide a measurement signal indicative of pressure on the diaphragm 14.

FIGS. 1 and 1A show one preferred embodiment of the invention in its overall operative state. FIGS. 2–2E illustrate manufacturing stages to fabricate the sensor 10 of FIG. 1.

FIG. 2 illustrates a general silicon-on-insulator (SOI) wafer 40. A silicon substrate 12 is implanted with oxygen ions 44 to create a buried silicon oxide layer 16 which typically is approximately 0.45 micron thick. Ion implantation is a known process and usually includes an ion source, focusing elements, an acceleration tube and a mass analyzer. The silicon oxide layer 16 can be formed precisely with known technologies and forms a dielectric isolator which inhibits leakage from subsequently-formed piezoresistive gage elements amongst themselves or to other electrically conductive elements of the wafer 40. A single-crystal silicon surface layer 42 is formed on the silicon oxide layer 16 by an annealing process, also well known, to a thickness typically of approximately 0.2 to 0.4 micron. Surface silicon annealing typically occurs over one to two hours in a dry nitrogen environment at a temperature over 1000° C.

The SOI wafer 40 of FIG. 2, formed by oxygen ion implantation and annealing, is commercially available. The SOI structure provides improved dielectric isolation when combined with further features of the invention. Further, the practice of the invention is not limited to the implanted silicon oxide layer 16 of FIGS. 1, 1A and 2; other silicon oxide forms are acceptable as dielectric isolators.

The SOI wafer 40 of FIG. 2 is selectively doped with boron ions 46, as illustrated in FIG. 2A, at the single-crystal silicon surface layer 42, to prepare for the formation of p-type piezoresistive gage elements and p+ interconnection. The piezoresistive gage elements 18 and interconnections 20 are formed by etching the doped single-crystal silicon, as illustrated in FIG. 2B. Preferably, but not required, nitride deposition forms a passivation layer 22, as shown in FIG. 2C; and selective etching of the layer 22 provides access to the contact 24 of FIG. 2D. The passivation layer 22 is functionally used to protect the gage elements from environmental factors such as humidity or contamination.

The sensing diaphragm 14 of FIG. 2D is formed on the passivation layer 22 by polysilicon deposition. Selective etching of the diaphragm 14 shapes the diaphragm boundary and provides access to the metal contact 24, which is thereafter formed by etching on each p+ interconnection 20, as exemplified in FIG. 2C, and by evaporated aluminum deposition. Other high temperature metals can also be used for the interconnections.

FIG. 2E illustrates a final step in the illustrated embodiment for producing the sensor 10 of FIG. 1 (for illustrative purposes, only one metal contact 24 is shown in FIGS. 2D and 2E). In particular, the silicon substrate 12 is etched with an appropriate etchant at the illustratively pyramidal etch region 49, while the front of the sensor, e.g., the diaphragm 14, is protected from the etchant by a conventional fixture 50, illustrated as having an O-ring interface seal 52.

Those skilled in the art will appreciate that modifications to the above description, and to the illustrated structures and procedures can be made without departing from the spirit and scope of the invention. For example, the sensor 10 of FIG. 1 is readily configured to external lead-out pads, and connected to a Whetstone bridge configuration as is well-known to those skilled in the art. Further, and without limitation, layer thicknesses and multiple oxygen ion implantations, as illustrated in FIGS. 1–2, can be changed and implemented through a variety of means.

It is thus seen that the invention efficiently attains the objects set forth above, among those apparent in the preceding description. In particular, the invention provides a high sensitivity semiconductor pressure sensor with relatively high temperature stability.

It is accordingly intended that all matter contained in the above description or shown in the accompanying drawings be interpreted as illustrative, rather than as limiting.

It is also understood that the following claims are to cover all specific and generic features of the invention as described herein, and all the statements of the scope of the invention.

Having described the invention, what is claimed as new and secured by Letter Patent is:

1. Semiconductor pressure sensor apparatus comprising
   A. a polysilicon diaphragm having opposed first and second surfaces,
   B. an etched silicon substrate supporting said diaphragm at said first surface for deflection of said diaphragm in response to a pressure difference between said first and second surfaces,
   C. first means forming single-crystal silicon piezoresistive sensing means mounted with said first surface of said diaphragm for sensing deflection of said diaphragm,
   D. dielectric isolation means of silicon oxide disposed for dielectrically isolating said sensing means, and
   E. first interconnection means in circuit with said sensing means for external electrical connection to said pressure sensor.

2. Semiconductor pressure sensor apparatus according to claim 1 wherein said sensing means is disposed substantially between said diaphragm and said substrate.

3. Semiconductor pressure sensor apparatus according to claim 1 wherein
   A. said first means includes silicon with a p-type implant, and
   B. said dielectric isolation means comprises a nitride deposition for passivation of said p-type implant of said first means.

4. Semiconductor pressure sensor according to claim 1, wherein said dielectric isolation means further comprises a nitride deposition layer interposed between said polysilicon diaphragm and said sensing means.

5. Semiconductor pressure sensor according to claim 1, wherein said piezoresistive sensing means comprises a piezoresistive gage element disposed between said polysilicon diaphragm and said substrate.

6. A method for manufacturing a semiconductor pressure sensor, said method comprising the successive steps of
   A. providing a silicon-on-insulator wafer, said wafer including a silicon substrate, a first silicon oxide implantation, and surface annealed silicon,
   B. forming a dielectrically isolated single-crystal silicon piezoresistive gage element in said surface silicon by successive boron ion implantation and etching,
   C. depositing polysilicon on said gage element to form a diaphragm having opposed first and second surfaces, said first surface being adjacent said piezoresistive gage element,
   D. forming an external connector by metal evaporation and etching, said external connector being in circuit with said gage element for providing an external electrical connection to said sensor, and
   E. etching said substrate to configure said diaphragm for deflection in response to a pressure difference between said first and second surfaces.

7. A method according to claim 6 comprising the further step of depositing passivation nitride on said piezoresistive gage element before said polysilicon-depositing step for providing additional dielectric isolation of said gage element.

8. Semiconductor pressure sensor apparatus comprising
   A. a polysilicon diaphragm having opposed top and bottom surfaces,
   B. a silicon substrate supporting said diaphragm for deflection of said diaphragm in response to a pressure difference between said top and bottom surfaces,
   C. a single-crystal silicon piezoresistive sensing means disposed between said polysilicon diaphragm and said silicon substrate for sensing deflection of said diaphragm,
   D. a layer of silicon oxide formed by oxygen ion implantation disposed between said piezoresistive sensing means and said silicon substrate for dielectrically isolating said sensing means, and
   E. first interconnection means in circuit with said sensing means for external electrical connection to said pressure sensor.

9. Semiconductor pressure sensor according to claim 8, further comprising a nitride deposition layer interposed between said bottom surface of said polysilicon diaphragm and said piezoresistive sensing means.

* * * * *